United States Patent Office 3,441,608
Patented Apr. 29, 1969

3,441,608
5β - N - METHYLAMINO - ETHOXYIMINO - 5H - DI-BENZO - [a,d] - 10,11 - DIHYDROCYCLOHEPTENE AND NON-TOXIC PHARMACEUTICALLY ACCEPTABLE SALTS THEREOF AND THEIR PRODUCTION
Siegismund Schütz, Wuppertal-Elberfeld, and Friedrich Hoffmeister, Wuppertal-Vohwinkel, Germany, assignors to Farbenfabriken Bayer Aktiengesellschaft, Leverkusen, Germany, a corporation of Germany
No Drawing. Filed Nov. 24, 1965, Ser. No. 509,608
Claims priority, application Germany, Nov. 26, 1964, F 44,539
Int. Cl. C07c 131/08, 131/00
U.S. Cl. 260—566                                    1 Claim

ABSTRACT OF THE DISCLOSURE

5β-N-methylamino-ethoxyimino-5H-dibenzo - [a,d]10,11-dihydro-cycloheptene and pharmaceutically acceptable non-toxic salts thereof possess antidepressive activity in humans and in vitro exhibit strong spasmolytic effect.

---

The present invention relates to new basically substituted oximes of 5H-dibenzo [a,d]-10,11-dihydro-cycloheptene-5-one, their non-toxic pharmaceutically acceptable salts and procedure for making same, the new compounds possessing useful pharmacological and pharmacodynamic properties when administered by the usual routes for these types of compounds.

Basically substituted 5H-dibenzo [a,d]-10,11-dihydro-cycloheptenes have achieved importance as antidepressive agents [J. Med. Chem., 7 (1964) pages 390–392; J. Med. Chem., 7, 88–94 (1964); J. Med. Pharm. Chem., 4,411–416 (1961)].

Basically substituted oximes of 5-H-dibenzo [a,d]-10,11-dihydro-cycloheptene-5-one, however, have not heretofore been disclosed or described in the literature. It has now been found that 5β-N-methylamino-ethoxyimino-5H-dibenzo-[a,d]10,11-dihydrocycloheptene of the formula:

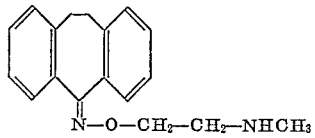

N—O—CH₂—CH₂—NHCH₃ have valuable and useful pharmacological properties.

They are also active in various animal experiments which give indications of the quality of their antidepressive (thymoleptic) activity in human beings.

The compound has moreover a strong spasmolytic effect in vitro.

Non-toxic pharmaceutically acceptable acids which are suitable for salt formation are, e.g., acetic acid, propionic acid, lactic acid, maleic acid, fumaric acid, succinic acid, tartaric acid, citric acid, salicylic acid, naphthalene-1,5-disulphonic acid, phosphoric acid, hydrochloric acid, and the like.

It has further been found that the new compounds can be produced by either reacting a 5H-dibenzo [a,d]-10,11-dihydro-cycloheptene of the formula:

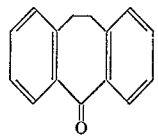

with a hydroxylamine of the formula:

H₂—N—O—CH₂—CH₂—NHCH₃ or first converting with hydroxylamine into an oxime of the formula:

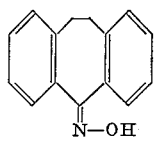

and then allowing the same to react, in the form of a suitable metal salt, with a halide of the formula:

Halogen—CH₂—CH₂—NHCH₃

Example 1

1.3 g. of sodium are dissolved in 150 ml. of absolute ethanol. There are added thereto 11.2 g. of 5-oximino-5H-dibenzo-[a,d]-10,11-dihydro-cycloheptene. There is then introduced a solution of 6.5 g. of methyl-amino-ethyl-chloride in absolute ethanol with stirring for one hour at room temperature. This is warmed overnight at 60° C. and finally boiled for 1½ hours under reflux. The product is suction filtered, the filtrate evaporated and the residue treated with cyclohexane. The cyclohexane extract is mixed with ethereal hydrochloric acid and the precipitated hydrochloride of 5H-dibenzo-[a,d]-10,11-dihydro-cyclo-heptene-5-(β-methylamino-ethoxyamine) melts at 196° C. after decantating the solvent and recrystalizing from acetone.

What is claimed is:
1. 5-(β-N-methylamino - ethoxyimino) - 5H - dibenzo-[a,d]-10,11-dihydro cycloheptene or pharmaceutically acceptable non-toxic salts thereof.

References Cited

UNITED STATES PATENTS 3,270,055   8/1966   Engelhard et al. _____ 260—566
3,234,279   2/1966   Kollonitsch et al. ___ 260—570.8

ALEX MAZEL, Primary Examiner.

JOSE TOVAR, Assistant Examiner.

U.S. Cl. X.R.
424—327